(12) United States Patent
Yamaoka et al.

(10) Patent No.: US 8,388,733 B2
(45) Date of Patent: Mar. 5, 2013

(54) HOLLOW-FIBER ELEMENT FOR ORGANIC-VAPOR SEPARATION

(75) Inventors: Shoichi Yamaoka, Ube (JP); Shigekazu Okamura, Ube (JP); Masao Kikuchi, Tokyo (JP); Tomonori Kanougi, Ichihara (JP); Yuma Irisa, Ichihara (JP)

(73) Assignee: Ube Industries, Ltd., Ube-shi (JP)

( * ) Notice: Subject to any disclaimer, the term of this patent is extended or adjusted under 35 U.S.C. 154(b) by 305 days.

(21) Appl. No.: 12/679,883

(22) PCT Filed: Sep. 29, 2008

(86) PCT No.: PCT/JP2008/067687
§ 371 (c)(1),
(2), (4) Date: Mar. 24, 2010

(87) PCT Pub. No.: WO2009/044711
PCT Pub. Date: Apr. 9, 2009

(65) Prior Publication Data
US 2010/0199840 A1   Aug. 12, 2010

(30) Foreign Application Priority Data
Sep. 30, 2007 (JP) ................................ 2007-257006

(51) Int. Cl.
*B01D 53/22* (2006.01)
(52) U.S. Cl. ................ 95/50; 95/43; 95/45; 96/8; 96/10
(58) Field of Classification Search ................ 95/43, 45, 95/50; 96/8, 10
See application file for complete search history.

(56) References Cited

U.S. PATENT DOCUMENTS

| | | | | |
|---|---|---|---|---|
| 3,808,303 | A | * | 4/1974 | Ganci et al. ..................... 264/41 |
| 4,842,910 | A | * | 6/1989 | Caskey ......................... 428/363 |
| 4,846,977 | A | * | 7/1989 | DeVellis et al. .............. 210/640 |
| 4,966,699 | A | * | 10/1990 | Sasaki et al. ............... 210/321.8 |
| 4,978,430 | A | | 12/1990 | Nakagawa et al. |
| 6,210,464 | B1 | | 4/2001 | Nakanishi et al. |
| 2012/0031831 | A1 | * | 2/2012 | Kanougi et al. ......... 210/321.61 |

FOREIGN PATENT DOCUMENTS

| | | |
|---|---|---|
| JP | 63-267415 A | 4/1988 |
| JP | S63-267415 A | 11/1988 |
| JP | H01-289884 A | 11/1989 |
| JP | H02-31821 | 2/1990 |
| JP | H02-218714 A | 8/1990 |
| JP | 2000-262838 A | 9/2000 |

OTHER PUBLICATIONS

Translation of JP 01289884 A, Nov. 21, 1989.*
Translation of JP 02031821 A, Feb. 1, 1990.*
Translation of JP 02218714 A, Aug. 31, 1990.*
International Search Report issued in corresponding PCT Application No. PCT/JP2008/067687, mailed Dec. 16, 2008.
International Preliminary Report on Patentability corresponding to PCT Application No. PCT/JP2008/067687, mailed May 14, 2010.

* cited by examiner

*Primary Examiner* — Jason M Greene
*Assistant Examiner* — Anthony Shumate
(74) *Attorney, Agent, or Firm* — Knobbe Martens Olson & Bear LLP

(57) ABSTRACT

A hollow fiber element constituting a separation membrane module for separating an organic vapor is disclosed. At least one end part of a fiber bundle consisting of multiple hollow fiber membranes having a selective permeability is fixed and bound with a tube sheet formed by a cured material of an epoxy resin composition. Herein, a resin component of the epoxy resin composition contains an epoxy compound (A) represented by the following formula (1), an epoxy compound (B) represented by the following formula (2) and an aromatic amine compound (C), and wherein the epoxy compound (A) and the epoxy compound (B) are blended at a proportion in a range from 90:10 to 60:40 by weight;

(1)

(2)

wherein R denotes alkyl group having 1 to 3 carbon atoms or hydrogen atom. The tube sheet has enough endurance to retain a gas-tightness of an internal space of the hollow fiber membrane and an external space of the hollow fiber membrane even in use under organic vapor with an elevated temperature and high pressure, and is suitably moldable in a stationary state as well.

15 Claims, 2 Drawing Sheets

HOLLOW-FIBER ELEMENT FOR ORGANIC-VAPOR SEPARATION

This application is the U.S. National Phase under 35 U.S.C. §371 of International Application PCT/JP2008/067687, filed Sep. 29, 2008 designating the U.S., and published in Japanese as WO 2009/044711 on Apr. 9, 2009, which claims priority to Japanese Patent Application No. 2007-257006, filed Sep. 30, 2007.

TECHNICAL FIELD

The present invention relates to a hollow fiber element for organic vapor separation, in which a fiber bundle consisting of multiple hollow fiber membranes having the selective permeability is fixed together with the tube sheet of the cured product of specific epoxy resin composition, and the method for producing the hollow fiber element. The present invention also relates to the gas separation membrane module for organic vapor separation housing the above-mentioned hollow fiber element in a vessel. The present invention furthermore relates to a method for organic vapor separation by employing the above-mentioned gas separation membrane module.

BACKGROUND ART

Methods using a separation membrane having the selective permeability has been drawn to attention for separating the organic vapor mixture produced by heating and vaporizing a liquid mixture containing organic compounds (the organic vapor separation). The gas separation membrane module used in this method includes plate and frame types, tubular types, hollow fiber types and the like. Among them, the hollow fiber type gas separation membrane module is industrially advantageous and is used extensively because not only it has beneficially the largest area of a membrane per unit volume but also it is excellent in pressure resistance and self-supporting.

The hollow fiber type gas separation membrane modules has the hollow fiber element, wherein at least one end of the fiber bundle consisting of multiple hollow fiber membranes having the selective permeability is fixed and bound together with a plate (tube sheet) of a cured resin of cast molding, and the fiber bundle is housed in a vessel equipped with at least a mixed gas inlet, a permeate gas outlet and a non-permeate gas outlet. Besides it functions to fix the fiber bundle together in a single body, the tube sheet has another function to partition the internal space of the hollow fiber membrane from its external space, and to retain the gas-tightness of the internal space and external space by sealing between the hollow fibers and between the hollow fibers and the vessel. The hollow fiber type gas separation membrane module would fail to perform suitable separation if the gas-tightness by the tube sheet were lost.

The organic vapor separation by using the hollow fiber type gas separation membrane module is carried out as follows. The organic vapor mixture produced by heating and vaporizing a liquid mixture containing organic compounds is supplied to the gas separation membrane module from a feed gas inlet. While the organic vapor mixture flows and contacts the hollow fiber membrane, the permeate vapor that has permeated the hollow fiber membrane is separated from the non-permeate vapor that has not permeated the hollow fiber membrane. The permeate vapor is collected from the permeate gas outlet and the non-permeate vapor is collected from the non-permeate gas outlet. Since the hollow fiber membrane has the selective permeability, the permeate vapor is rich in a component with higher permeability rate (the higher permeable component) and the non-permeate vapor has less such component. As a result, the organic vapor mixture is separated into the permeate vapor rich in the higher permeable component and the non-permeate vapor with less of the higher permeable component.

As the organic vapor separation by using the hollow fiber type gas separation membrane module, for example, the patent document 1 proposes a method for purifying and collecting a high-purity organic compound by dehydrating an aqueous solution containing the organic compound. The aqueous solution containing the organic compound is initially heated and vaporized to produce an organic vapor mixture comprising the vapor of the organic compound and the water vapor, and next the organic vapor mixture is fed to contact one side of the hollow fiber type gas separation membrane (hollow fiber membrane) made from aromatic polyimide at a temperature not lower than 70° C. While organic vapor mixture flows, the water vapor is selectively separated by permeation, whereby the organic vapor mixture with a reduced content of the water vapor is obtained.

The patent document 2 proposes a method for effectively dehydrating a water-organic vapor with a relatively small area. The effective dehydration is achieved by using a gas separation membrane module, in which the circumferential part of the hollow fiber bundle is covered with a film-form substance.

As a resin for cast molding used in the application of the tube sheet for the hollow fiber type gas separation membrane module for organic vapor separation, for example, the patent document 3 discloses the epoxy resin composition containing a tetraglycidyl compound.

As an adhesive for the hollow fiber for the separation membrane used for the separation of an organic solvent by the pervaporation method, for example, the patent document 4 also discloses a bifunctional or trifunctional epoxy resin composition obtained by the reaction with aminophenols and epihalohydrin.

Patent document 1: JP-A-S63-267,415
Patent document 2: JP-A-2000-262,838
Patent document 3: JP-A-H02-31,821
Patent document 4: JP-A-H02-218,714

DISCLOSURE OF THE INVENTION

Problems to be Solved by the Invention

Since in the organic vapor separation, the organic vapor mixture obtained by heating a liquid mixture containing organic compounds is supplied to the gas separation membrane module to separate it, the tube sheet is exposed to the organic vapor at a temperature higher than the boiling point of the organic compound. It is, therefore, necessary to prevent the tube sheet from losing its gas-tightness due to the reduction of mechanical strength associated with swelling and crack, and reduction of adhesiveness with the hollow fiber and the like.

In many cases for the gas separation method employing the separation membrane, efficient gas separation is achieved by supplying the gas mixture in a state under high pressure. Since the amount of the permeate-component gas having permeated the gas separation membrane is proportional to the difference of the partial pressures of the permeate-component gases on both sides of the gas separation membrane, supplying the gas mixture having higher pressure enables more efficient gas separation.

Generally, a boiling point of substance rises when ambient pressure increases. It is, therefore, necessary to further elevate the temperature of the organic vapor mixture to be supplied to the gas separation membrane module in order to supply the organic vapor mixture having higher pressure to the gas separation membrane module for the organic vapor separation. That is to say, there has been a problem in a higher risk of losing the gas-tightness of the tube sheet because the tube sheet is exposed to the organic vapor with a higher temperature and higher pressure than ever before if the organic vapor mixture under higher pressure is supplied to the gas separation membrane module.

For the method for molding the tube sheet, centrifugal molding, static molding and the like are also performed. In terms of the centrifugal molding, there is a problem of difficulty in improving productivity because the centrifugal molding requires large equipments. On the other hand, the static molding is moldable with simple equipments and it is easy to improve productivity. There has been, however, a problem of difficulty in molding a tube sheet with uniform thickness when the resin disclosed in, for example, the patent document 3 were employed as a resin for cast molding.

The objective of the present invention is to provide the hollow fiber element for organic vapor separation having the tube sheet with enough endurance to retain gas-tightness of the internal space and external space of the hollow fiber membrane even in use under organic vapor with an elevated temperature and high pressure as well as suitably moldable in a stationary state, and to provide the gas separation membrane module for organic vapor separation as well.

Means of Solving the Problems

The present invention relates to a hollow fiber element constituting a separation membrane module for separating an organic vapor, in which at least one end-part of a fiber bundle consisting of multiple hollow fiber membranes having a selective permeability is fixed and bound with a tube sheet formed by a cured material of an epoxy resin composition, wherein
a resin component of the epoxy resin composition comprises:
an epoxy compound (A) represented by the following formula (1)
an epoxy compound (B) represented by the following formula (2), and
an aromatic amine compound (C); and
the epoxy compound (A) and the epoxy compound (B) are blended at a proportion in a range from 90:10 to 60:40 by weight.

(1)

(2)

(in the formula, R denotes alkyl group having 1 to 3 carbon atoms or hydrogen atom)

Preference is given to triglycidyl-4-aminophenol for the epoxy compound (B).

Preference is given to 4,4'-diaminodiphenyl ethane for the aromatic amine compound (C).

It is preferred that the hollow fiber element has a core tube having a function to introduce a gas into an approximately center part of the fiber bundle consisting of the multiple hollow fiber membranes.

It is preferred that the hollow fiber element comprises a carrier gas guide film covering a circumferential part of the fiber bundle consisting of the multiple hollow fiber membranes.

The present invention also relates to a method for producing a hollow fiber element for organic vapor separation, comprising:
placing a end part of a fiber bundle consisting of multiple hollow fiber membranes having a selective permeability into a mold,
injecting an epoxy resin composition into the mold, and
curing the epoxy resin composition to form a tube sheet at the end part of the fiber bundle, whereby fixing and binding the end part of the hollow fiber membranes, wherein
a resin component of the epoxy resin composition comprises:
an epoxy compound (A) represented by formula (1):

(1)

an epoxy compound (B) represented by formula (2):

(2)

wherein R denotes alkyl group having 1 to 3 carbon atoms or hydrogen atom, and
an aromatic amine compound (C); and
the epoxy compound (A) and the epoxy compound (B) are blended at a proportion in a range from 90:10 to 60:40 by weight.

Herein, preference here is given to triglycidyl-4-aminophenol for the epoxy compound (B). Preference is also given to 4,4'-diaminodiphenylmethane for the aromatic amine compound (C).

It is preferred that the epoxy resin composition injected into the mold is cured in a stationary state to form the tube sheet in the production method of the present invention.

The present invention also relates to a gas separation membrane module for organic vapor separation, comprising:
a vessel having at least a mixed gas inlet, a permeate gas outlet and a non-permeate gas outlet, and
the above-mentioned hollow fiber element for organic vapor separation housed in the vessel.

In the gas separation membrane module for organic vapor separation, it is preferred that the vessel additionally has a carrier gas inlet.

In the gas separation membrane module for organic vapor separation, it is preferred that the mixed gas inlet and the non-permeate gas outlet are communicating with an internal space of the hollow fiber membranes, and the carrier gas inlet and the permeate gas outlet are communicating with an external space of the hollow fiber membranes.

The present invention also relates to a method for organic vapor separation mixture, which employs the above-mentioned gas separation membrane module for organic vapor separation.

In this method, it is preferred that the organic vapor mixture is introduced from the mixed gas inlet at a temperature not lower than 80° C. and a highly-permeable component is allowed to selectively permeate the hollow fiber membranes, whereby producing a highly-purified organic vapor as a permeate vapor or a non-permeate vapor.

Effect of the Invention

The present invention can provide a hollow fiber element for organic vapor separation which can be suitably used for organic vapor separation and comprises a tube sheet which exerts enough endurance and does not lose its gas-tightness even under an organic vapor atmosphere at an elevated temperature and high pressure, and the gas separation membrane module for organic vapor separation as well.

The present invention can also enable, even though not using the centrifugal molding method, to easily produce the hollow fiber element for organic vapor separation comprising the tube sheet which does not lose its gas-tightness even under an organic vapor atmosphere at an elevated temperature and high pressure.

The use of the gas separation membrane module of the present invention can enable the organic vapor separation with excellent endurance even under a condition at an elevated temperature and high pressure.

EXPLANATION FOR NUMERICAL ITEMS

1 Mixed gas inlet
2 Carrier gas inlet
3 Permeate gas outlet
4 Non-permeate gas outlet
5 Cylindrical vessel
6 Hollow fiber bundle
6a Hollow fiber membrane
7 Tube sheet
7a First tube sheet
7b Second tube sheet
8 Carrier gas guide film
9 Core tube
10 Connecting hole of core tube
11 Mold

BEST MODE FOR CARRYING THE INVENTION

Hereinafter, there will be explained the hollow fiber element for organic vapor separation of the present invention, the method for producing the hollow fiber element, the gas separation membrane module for organic vapor separation housing the hollow fiber element, and the method for separating organic vapor mixture by using the separation membrane module.

Figure 1:
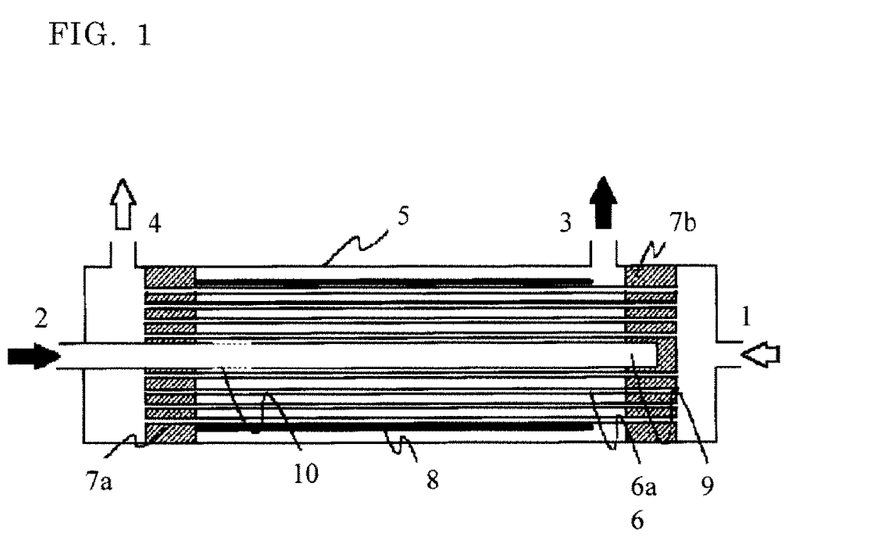
FIG. 1 is a schematic drawing which shows an example of the gas separation membrane module for organic vapor separation.

FIG. 1 is a schematic cross-sectional drawing showing an example of the gas separation membrane module for organic vapor separation of the present invention, wherein the gas separation membrane module has a core tube for supplying carrier gas in an approximately center part of a fiber bundle and has a carrier gas guide film covering a circumferential part of the fiber bundle. In the gas separation membrane module shown in FIG. 1, the outer frame is comprised of cylindrical vessel 5 having mixed gas inlet 1, carrier gas inlet 2, permeate gas outlet 3 and non-permeate gas outlet 4; and in the cylindrical vessel 5 is accommodated the fiber bundle 6 formed by bundling multiple hollow fiber membranes 6a having selective permeability as the hollow fiber element having the following configuration. That is to say, the fiber bundle 6 is each fixed with the second tube sheet 7b consisting of the cured material of the epoxy resin composition at the end part on the side of the permeate gas outlet 3 in the figure, and with the first tube sheet 7a consisting of the cured material of the epoxy resin composition at the end part on the side of the non-permeate gas outlet 4 in the figure to form the hollow fiber element as a whole. In the hollow fiber element, hollow fiber membranes 6a forming the hollow fiber bundle 6 penetrate the tube sheets 7a and 7b at each side and fixed therewith, while keeping the hollows in open state. In addition, the circumferential part of the hollow fiber bundle 6 is covered with the carrier gas guide film 8 through the positions from where the carrier gas is introduced to where the carrier gas is discharged. In addition, is equipped the core tube 9 that penetrates the tube sheet 7a, which is arranged at the approximately center part of the hollow fiber bundle 6, along the hollow fiber bundle. The connecting hole 10 connecting the internal space of the core tube and the hollow fiber bundle is formed on the core tube at the position near the tube sheet 7a on the side where the carrier gas is introduced.

Next is explained an example of the method for separating the organic vapor mixture using the separation membrane module shown in FIG. 1. The organic vapor mixture is preferably superheated and introduced from the mixed gas inlet 1 into the internal space of the hollow fiber membrane 6a through the aperture of the hollow fiber membrane. While the organic vapor mixture flows through the internal space of the hollow fiber membrane, the permeate vapor containing the higher permeable component selectively permeates and moves to the space where the hollow fiber bundle is housed between the tube sheets 7a and 7b. The non-permeate vapor which has not permeated is discharged from the non-permeate gas outlet 4 through the space which another aperture of the hollow fiber membrane faces. The carrier gas is introduced from the carrier gas inlet 2 of the core tube 9, introduced from the connecting hole 10 of the core tube 9 to the space where the hollow fiber is mounted between the tube sheets 7a and 7b, and flows with contacting the outside of the hollow fiber membranes 6a, and discharged from the permeate gas outlet 3 together with the permeate gas from the hollow fiber membrane. Therefore, the flows of the organic vapor mixture and carrier gas are countercurrent in the module on both sides sandwiching the separation membrane. In addition, the partial pressure of the higher permeable component is controlled such that it is lower on the permeate side than that on the supply side.

Next is explained the hollow fiber element according to the present invention. The hollow fiber element according to the present invention is one in which at least one end part of the hollow fiber bundle consisting of the multiple hollow fiber membranes having at least selective permeability is fixed and bound with the tube sheet formed by the cured material of the epoxy resin composition in a state where the aperture of the hollow fiber is maintained. While an example of the embodiments are as shown in the schematic drawing of FIG. 1 and explained as above, it is not limited only to the example.

The hollow fiber membrane having the selective permeability to be employed for the hollow fiber element of the present invention is formed with a suitable material for separation subject gas and separation condition. It is preferably formed, for example, of a material such as elastomer or glassy polymer, such as polybutadiene, polychloroprene, butyl rubber, silicone resin, polyethylene, polypropylene, ethylene-propylene copolymer, polystyrene, poly-4-methyl-1-pentene, polytetrafluoroethylene, polyvinylidene fluoride, tetrafluoroethylene-ethylene copolymer, polychlorotrifluoroethylene, cellulose acetate, polyvinyl chloride, polyvinyl alcohol, polymethylmethacrylate, polyamide, polysulfone, polyethersulfone, polyether ether ketone, polyimide, polyamide imide, polyetherimide, polyphenylenesulfide, polyarylate, polycarbonate and the like. In the application for separating the organic vapor, the hollow fiber membrane made of aromatic polyimide is most preferred, which is excellent particularly in heat resistance, organic solvent resistance and permeation efficiency.

The structure of the hollow fiber membrane may be homogeneous, or heterogeneous such as a composite membrane and asymmetric membrane. In the application for separating the organic vapor, the asymmetric membrane made of aromatic polyimide is most preferred because it is excellent in selectivity and permeation efficiency. The membrane preferably used has the thickness of 20 to 200 μm the outside diameter of 50 to 1,000 μm.

The hollow fiber bundle according to the present invention is formed by bundling the multiple hollow fiber membranes having the selective permeability. Usually, a number from 100 to 1,000,000 of the hollow fiber membranes are bundled. There is no particular restriction for the form of the hollow fiber bundle that has been bundled. For example, it may be a hollow fiber bundle in which the hollow fiber membranes have been bundled in the shape of a rectangular column or flat plate, and the tube sheet may be the shape of a rectangular parallelepiped. From the viewpoint of easiness in production and pressure resistance of the vessel, preferably employed is a hollow fiber bundle that is bundled cylindrically and a disc form tube sheet. The hollow fibers may be oriented substantively parallel to an axis or with a certain angle; however, it is preferred to be bundled so as to have alternately-crossed orientation with an angle from 5 to 30 degree to the axial direction.

In terms of the hollow fiber element of the present invention, the tube sheet may fix both end parts of the hollow fiber bundle or only one of the end parts of the hollow fiber bundle. Even in the case where the hollow fiber element is fixed by the tube sheets at both end parts of the hollow fiber bundle, ends of hollow fibers may be choked (i.e. blocked) at one side of ends as long as the hollow fiber is kept open at another side. For the hollow fiber element in which the tube sheet fixes only one of end parts, the hollow fibers are not open at another end part by choking (i.e. blocking) the openings of the hollow fibers at one side, or folding the hollow fiber in U-shape. The hollow fiber bundle are preferably fixed with the tube sheet at both of end parts while the openings of the hollow fiber bundle at both of fiber ends are maintained.

The epoxy resin composition employed for the tube sheet of the hollow fiber element of the present invention comprises the epoxy compound (A) represented by the formula (1), the epoxy compound (B) represented by the formula (2), and the aromatic amine compound (C), wherein the epoxy compound (A) and epoxy compound (B) are blended at a proportion by weight in a range (A):(B)=90:10 to 60:40, preferably 85:15 to 65:35, more preferably 80:20 to 70:30.

The epoxy compound (A) represented by the formula (1) includes jER 604 made by Japan Epoxy Resins Co., Ltd., EPICLON 430 made by DIC Corporation, EPOTOHTO YH-434 made by Tohto Kasei Co., Ltd. and the like.

Specific examples of the trifunctional epoxy compound (B) represented by the formula (2) include triglycidyl derivative such as 4-amino-phenol, 4-amino-m-cresol, 4-amino-o-cresol, 2-ethyl-4-aminophenol, 3-ethyl-4-aminophenol. Among them, particular preference is given to triglycidyl-4-aminophenol. Triglycidyl-4-aminophenol includes jER 630 made by Japan Epoxy Resins Co., Ltd. and the like.

For the aromatic amine compound (C), preference is given to aromatic diamine having one to three aromatic rings, and particular preference is given to 4,4'-diaminodiphenylmethane among them. 4,4'-Diaminodiphenylmethane includes MDA-200 made by Mitsui Chemical Polyurethane, Inc. and the like.

The epoxy resin composition contains the epoxy compound (A) represented by the formula (1) and the epoxy compound (B) represented by the formula (2), the ratio of which by weight is in a range of (A):(B)=90:10 to 60:40. The epoxy compound (A) more than 90% by weight and the epoxy compound (B) less than 10% by weight are not preferred because moldability tends to deteriorate; for example, filling properties becomes extremely worse, and also organic solvent resistance tends to deteriorate. In addition, the epoxy compound (A) less than 60% by weight and the epoxy compound (B) more than 40% by weight are not preferred because molding tends to be unsuccessful due to large shrinkage on curing the epoxy resin composition.

The ratio of the aromatic amine compound for curing used in the epoxy resin composition is preferably stoichiometric amount to about 60 percent of the stoichiometric amount, wherein the stoichiometric amount is calculated from the epoxy equivalent of the epoxy resin and the active hydrogen equivalent of the aromatic amine compound. Further preferred blend ratio is from the stoichiometric amount to 80 percent of the stoichiometric amount. It is not preferred to use the aromatic amine compound more than or equal to the stoichiometric amount because the reaction of curing the epoxy resin composition becomes too much exo-thermic and therefore the tube sheet with high durability is not formed. In addition, it is not preferred to use the aromatic amine compound in amount less than 60 percent of the stoichiometric amount because curing of the epoxy resin composition becomes insufficient and therefore the tube sheet with high strength is not formed.

The epoxy resin composition may also contain component(s) other than the resin component mentioned above, for example, filler and the like, or it may consist of the resin component only without containing others.

It is preferred that the hollow fiber element of the present invention has the core tube having the function to introduce gas into the approximately center part of the hollow fiber bundle. The gas to be introduced into near the center part of the hollow fiber bundle is preferably carrier gas. Since the object thereof is to diffuse the introduced gas throughout the entire hollow fiber bundle, the approximately center part of the hollow fiber bundle as referred herein may be a certain level so as to achieve the object and is by no means limited to precise center.

The material used for forming the core tube is not particularly limited as long as the core tube has predetermined gastightness and pressure resistance and it is preferably formed of metal, plastic, or ceramics and the like. While the distal end of the core tube is closed and buried in the second tube sheet 7b in the case shown in the FIG. 1, the anchoring to the tube sheet may not be necessary, and the presence of a gap at a level that can absorb displacement by thermal expansion and the like is preferred.

In the hollow fiber element of the present invention, it is preferred that the carrier gas guide film is disposed on the circumferential part of the hollow fiber bundle in advance. The material of the carrier gas guide film is not particularly limited; however, it may be formed of any material as long as the material does not substantially allow or does scarcely allow to permeate the mixed gas supplied into the device. The examples preferably used are plastic film such as polyethylene, polypropylene, polyamide, polyester, polyimide or metallic foil of aluminum or stainless-steel. Particular preference is given to polyimide film in view of heat resistance, solvent resistance and processability. In addition, while the thickness of the carrier gas guide film 8 is not particularly limited, its preferred range may be from several tens of micrometers to 2 mm because too thick film may occupy the space where the hollow fibers are disposed and reduce effective membrane area. It is preferred that the carrier gas guide film is fixed with the tube sheet in a similar manner to the hollow fibers. In addition, the carrier gas guide film is preferably disposed such that it is fixed on the first tube sheet 7a, which is on the side near to the connecting hole of core tube, and not fixed on the second tube sheet 7b by taking a gap, because this configuration allows the carrier gas to flow in a direction opposite to the organic vapor mixture and enhances the separation efficiency.

Next, the method for producing the hollow fiber element of the present invention will be explained. Firstly, the method for bundling the hollow fiber membranes to form the hollow fiber bundle will be explained.

The method for bundling the hollow fiber membranes so as to have alternately-crossed orientation with an angle from 5 to 30 degree to the axial direction is, for example, the following method. 1 to 100 of the hollow fiber membranes are distributed on a core tube by means of a fiber distribution guide that reciprocates at a constant rate in the axial direction of the tubular material to be a core (core tube), and at the same time the core tube rotates at a constant rate. Consequently, the hollow fiber membranes are not arranged parallel to the axis, but distributed with an angle in accordance with the rotation of the core tube against the axial direction. Once the fiber under distribution reaches one of the ends, the hollow fiber membranes are fixed on the site and the fiber distribution guide retraces in the opposite direction to carry out the further distribution of the fiber. Since the core tube continues to rotate in the same direction, the fiber distribution is in turn performed with the same angle to the previous one just in the opposite direction against the axial direction. By repeating this step, the hollow fiber membranes are distributed alternately crosswise on the hollow fiber membranes having been distributed with the opposite angle to be bundled into the hollow fiber bundle.

Figure 2:
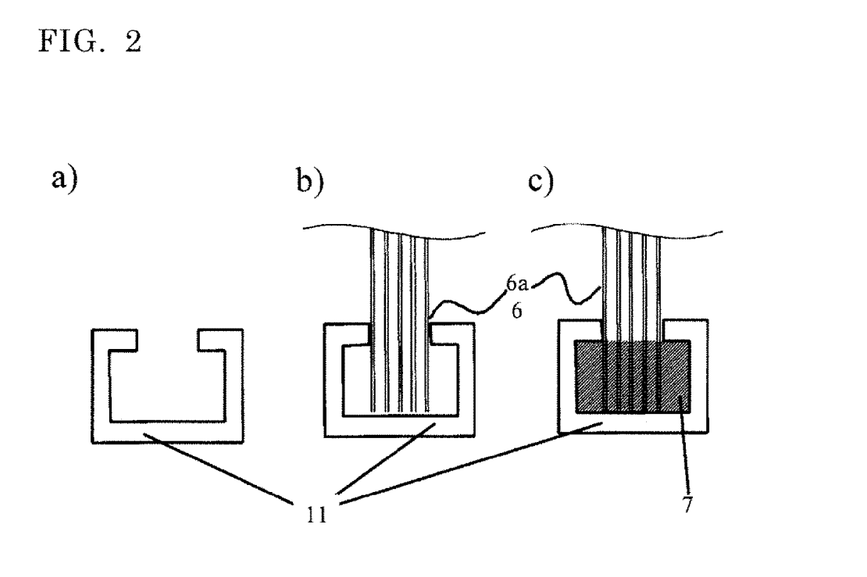
FIG. 2 is a schematic drawing which shows a method for making a hollow fiber element for organic vapor separation according to the present invention.

Next, there will be explained the method for forming the tube sheet according to the present invention as follows. The hollow fiber bundle 6 is formed by the method mentioned above by bundling a predetermined number of the hollow fiber membranes with predetermined length. After removing the core tube or retaining the core tube in the approximately center part of the fiber bundle, the hollow fiber bundle is installed at a predetermined position in the mold 11 as shown in FIG. 2a, and the hollow fiber bundle is held substantially vertically with the end part downwards. An illustrative drawing of this situation is shown in FIG. 2b.

Then, a predetermined amount of the epoxy resin composition is injected into the mold 11 for forming the tube sheet. An illustrative drawing of the state where the epoxy resin composition has been injected is shown in FIG. 2c. The method for injecting the epoxy resin composition is not particularly limited; however, preference is given to the injection from a plurality of positions on the downside of a vessel by a syringe because of easiness in uniform injection. If the injection rate of the epoxy resin composition is too high, uniform injection of the epoxy resin composition into the sites to be filled is difficult, and therefore, preferably, sufficient time should be taken for the injection. It is preferred to suitably control the temperature of the mold during the injection of the epoxy resin composition into the mold. It is also preferred to control the temperature of the epoxy resin composition.

After injecting the epoxy resin composition into the mold 11, the epoxy resin composition is cured by maintaining the hollow fiber bundle at a constant temperature to form the tube sheet. The temperature used herein is preferably not higher than 100° C., and more preferably at 30 to 80° C. The higher temperature is not preferred because it leads to more vigorous reaction in the curing of the epoxy resin composition, which adversely affect the strength of the tube sheet.

In the present invention, it is important that the epoxy resin composition is uniformly charged between the hollow fiber bundles and unnecessary climbing of liquid should not occur before curing of the epoxy resin composition. If it were charged insufficiently, a thinner part of the tube sheet might be formed resulting in deficient strength or ever the tube sheet might not be able to be formed. On the other hand, the climbing of liquid is a phenomenon where the composition is pulled up due to the surface tension between the hollow fibers. Since the surface of the hollow fiber is covered with the cured material of resin by the climbing of liquid, there is a problem of decrease in the effective membrane area. In the production method of the present invention, it is contemplated that the epoxy resin composition has an appropriate viscosity, surface tension and affinity with the hollow fiber material. Consequently, the epoxy resin composition is assumed to have excellent property in filling the space of the hollow fiber bundles and show the small unnecessary elevation of liquid. Particular preference is given to the composition having viscosity of 2.0 to 10 Pa·s as measured at 40° C.

It is preferred to conduct post-curing by heating the epoxy resin composition after curing the epoxy resin composition in regard to the durability and mechanical properties of the tube sheet. The temperature of 100° C. to 250° C. for post-curing is preferred. It is not preferred that the temperature upon post-curing is lower than 100° C. because the epoxy resin composition would be cured insufficiently. In addition, it is not preferred that the temperature upon post-curing is too high because it leads to vigorous reaction in the curing of the epoxy resin composition, which adversely affect the strength of the tube sheet. When the epoxy resin composition is post-cured, it may be divided to several stages and may be heated at different temperature at each stage.

After post-curing the epoxy resin composition, the tube sheet is cut to open the hollow fiber membrane at its end part. Thus, formed is the hollow fiber element fixed with the tube sheet while retaining the hollow fibers in an opened state at its end part.

If the tube sheets are to be formed at both the end parts of the hollow fiber bundle, after forming the tube sheet at one of the end parts of the hollow fiber bundle by the above-mentioned procedure, the tube sheet is formed at another end part by a similar procedure. The term "after forming the tube sheet at one of the end parts" may be even after cutting the tube sheet to open the hollow fiber membranes at its end part. It is also preferred that after injecting the epoxy resin composition into the mold at one end part and curing it but before post-curing, another tube sheet at another end part is formed so as to conduct the post-curing and subsequent procedure thereafter simultaneously at both of the end parts.

The carrier gas guide film 8 formed on the circumferential part of the hollow fiber bundle 6 may also be produced as follows. First, the hollow fiber bundle having bundled hollow fiber membranes is produced by the above-mentioned method or the like. A polyester film, for example, is wrapped around and its overlapping part is glued to form the carrier gas guide film 8 on the circumference of the bundle. Then, keeping the film being wrapped around, tube sheets are formed at both the end parts of the bundled. In doing so, the film end is also fixed together at the end part corresponding to the tube sheet 7a on the side of the carrier gas inlet, and another end of the film is not fixed to the tube sheet 7b at the end part corresponding to the tube sheet 7b on the side of the carrier gas outlet so as to ensure gap that allows the permeate gas and carrier gas to flow out from the hollow fiber bundle to the permeate gas outlet. In addition, at the circumference of the hollow fiber bundle may be equipped with an inner case consisting of mesh or two of half-cases to protect the hollow fiber element so that a flow path for the organic vapor mixture is ensured.

The gas separation membrane module for organic vapor separation according to the present invention is composed by accommodating (housing) one or two or more of the above-mentioned hollow fiber element(s) for organic vapor separation in a vessel having at least a mixed gas inlet, a permeate gas outlet and a non-permeate gas outlet. The embodiment of the gas separation membrane module is not particularly limited and it may be a hollow feed-type or shell feed-type, or a type employing carrier gas or type employing no carrier gas. For the type employing the carrier gas, it is preferred to dispose the carrier gas inlet on the vessel, or to dispose the carrier gas inlet within the hollow fiber element.

For the gas separation membrane module of the present invention, it is preferred that the hollow fiber element is detachable. The gas separation membrane module having the hollow fiber element within the vessel is partitioned by the tube sheet and sealed except a flow path of vapor to form a space having gas-tightness. The sealing method is not particularly limited; however, elastic O-rings and gaskets are preferably employed.

The gas separation membrane module for organic vapor separation of the present invention may take various embodiments depending on the forms of the housed hollow fiber element and the arrangements of the mixed gas inlet, permeate gas outlet, non-permeate gas outlet and the like. For example, it may be either cylindrical or box-shaped. In any case, the space leading to the internal space of the hollow fiber membrane and the space leading to the external space of the hollow fiber membrane are separated one another to retain the gas-tightness in the module. Since the vessel of the gas separation membrane module is subjected to fluid at an elevated temperature and fluid under high pressure or a condition under reduced pressure when the separation of organic vapor is carried out, sufficient strength and stability under use conditions are necessary for the vessel. Its material is not particularly limited; however, metal, plastic, glass fiber composite material and ceramics are preferably used.

It is preferred that the gas separation membrane module for organic vapor separation of the present invention is composed such that the mixed gas inlet and non-permeate gas outlet lead to the internal space of the hollow fiber membrane, and the carrier gas inlet and permeate gas outlet lead to the external space of the hollow fiber membrane. In particular, it is preferred that the carrier gas inlet is arranged to the core tube placed in the approximately center part of the hollow fiber element.

The method for separating the organic vapor mixture by using the gas separation membrane module for organic vapor separation of the present invention will be explained.

In the gas separation with the separation membrane, two spaces that sandwich the separation membrane are divided into the space (primary side) into which the feedstock gas is supplied and the space (secondary side) into which the permeate gas permeates to be given. In the method for separating the organic vapor mixture using the gas separation membrane module for organic vapor separation of the present invention, it may be either the hollow feed where the internal space of the hollow fiber membrane is the primary side (the side for supplying the feedstock gas) or the shell feed where, in contrast, the external space of the hollow fiber membrane is the primary side. In order to effectively utilize the hollow fiber membrane, preference is given to the hollow feed where the feedstock gas less likely drifts. In both cases of the shell feed and hollow feed, the method for separating the organic vapor mixture by means of the gas separation membrane module is carried out by the method described below. That is to say, the organic vapor mixture supplied from the mixed gas inlet into the space on the primary side in the gas separation membrane module flows with contacting the surface of the hollow fiber membranes and it is discharged outside module from the non-permeate gas outlet. In the meanwhile, the permeate gas that has permeated the hollow fiber membranes is discharged outside module from the permeate gas outlet placed in the secondary side space. Since the hollow fiber membranes have the selective permeability, the permeate gas that has permeated the membranes is rich in the high permeable component and the non-permeate gas discharged from the non-permeate gas outlet has the reduced concentration of the high permeable component.

In the method for separating the organic vapor mixture by the gas separation membrane module for organic vapor separation of the present invention, its operations are carried out such that the partial pressure of the high permeable component on the primary side is higher than the partial pressure of the high permeable component on the secondary side. Specific example is the method of holding the secondary side of the membranes under reduced pressure to ensure the partial pressure difference of the high permeable component between the both sides of the hollow fiber membranes. The method of circulating the carrier gas on the secondary side surface of membranes is also exemplified. Among them, preference is given to the method of circulating the carrier gas on the secondary side surface of membranes and, in addition, it is preferred to have such a construction that the carrier gas flow is a countercurrent flow to the organic vapor mixture on both sides that sandwich the hollow fiber membranes.

The carrier gas is not particularly limited as long as the gas does not contain high permeable component or contains it at such a concentration that at least the partial pressure of the high permeable component is lower than that of the non-permeate gas, and for example, nitrogen, air and the like may be used. Since nitrogen less likely reverse-permeates from the secondary side to the primary side of the membrane and is inert, nitrogen is a preferred carrier gas also from the viewpoint of fire prevention. In addition, it is also preferred that a portion of the non-permeate gas from which the high permeable component has been separated is cycled to the supply inlet of the carrier gas for the use as the carrier gas.

In the hollow feed-type gas separation membrane module, the ca gas has a function to promote the permeation by flowing along the outside of the hollow fiber membranes. It is, therefore, preferred for the carrier gas to uniformly flow along the outside of the hollow fiber membranes without short paths.

In the method for separating the organic vapor mixture by the gas separation membrane module for organic vapor separation of the present invention, the organic vapor mixture (mixed gas) to be separate is not particularly limited as long as it is a mixture of two or more gases containing the vapor of organic compound. The method may be preferably used, for example, to separate water vapor from the mixed vapor of water vapor and organic vapor (dehydration of organic vapor) or to separate methanol from the mixed vapor of methanol and dimethyl carbonate.

The preferred organic compounds are those having boiling point not lower than 0° C. and not higher than 200° C. under the normal pressure. The reason that the boiling point of organic compound should be not lower than 0° C. and not higher than 200° C. is based on practical reason in considering the usage temperature range of the hollow fiber membrane, the facilities for superheating and vaporizing the organic vapor mixture, and the facilities for condensing and collecting the purified separated component and easiness in handling.

The organic compound having boiling point not lower than 0° C. and not higher than 200° C. under the normal pressure includes aliphatic alcohols such as methanol, ethanol, n-propanol, isopropanol, n-butanol, s-butanol, t-butanol, ethylene glycol; alicyclic alcohols such as cyclohexanol; aromatic alcohol such as benzyl alcohol; organic carboxylic acids such as formic acid, acetic acid, propionic acid, butyric acid; organic acid esters such as butyl acetate, ethyl acetate; ketones such as acetone, methyl ethyl ketone; cyclic ethers such as tetrahydrofuran, dioxane; organic amines such as butylamine, aniline, and the mixture of these compounds.

In the method for separating organic vapor mixture by the gas separation membrane module for organic vapor separation of the present invention, the organic vapor mixture is heated and vaporized by means of a vaporization (distillation) apparatus and the like, and it is supplied to the gas separation membrane module for organic vapor separation as the organic vapor mixture in a state under the normal pressure or in a pressurized state of 0.1 to 6 atm (gauge pressure). The organic vapor mixture in a pressurized state may be directly obtained by a pressurized evaporator, or it may be obtained by pressurizing, by a vapor compressor, the organic vapor mixture under the normal pressure which has been obtained by a normal pressure evaporator.

It is also preferred that the organic vapor mixture is supplied as the organic vapor mixture superheated at sufficiently high temperature that does not cause condensation while being supplied to the gas separation membrane module for organic vapor separation, circulating inside the hollow fiber and being discharged from the non-permeate gas outlet.

The organic vapor mixture to be supplied to the gas separation membrane module for organic vapor separation of the present invention preferably has a temperature not lower than 80° C., more preferably not lower than 90° C. and yet preferably not lower than 100° C.

As the method for obtaining the superheated organic vapor mixture, it is specifically preferred to gasify the solution mixture containing the organic compound using a vaporization apparatus equipped with a heating device and at the same time to carry out the heating (superheating) treatment. The superheated organic vapor mixture may also be preferably obtained by carrying out the heating (superheating) treatment of the gasified organic vapor mixture by a heating device furnished separately.

As necessary, the treatment to reduce pressure may be carried out while keeping its temperature, then the organic vapor mixture may be supplied to the gas separation membrane module for organic vapor separation. The method of treatment for reducing pressure may be performed using usual pressure reducing valves and the like, or may be based on a treatment of the gasified gas mixture using a demister (mist separator) and the like to remove mist and at the same time to generate pressure loss.

The organic vapor mixture after the treatment becomes the gas mixture having pressure less than its saturation vapor pressure at the given temperature, and it is preferred to be supplied to the gas separation membrane module for organic vapor separation as retaining its state (specifically kept at the constant temperature). In doing so, the organic vapor mixture is not condensed while circulating inside the hollow fiber membrane and being discharged from the non-permeate gas outlet.

Among the organic substances, the present invention may be preferably used for dehydrating an aqueous solution containing alcohol, in particular may be preferably used for dehydrating an aqueous solution containing ethanol or isopropanol.

EXAMPLES

Hereafter, the present invention is explained by the examples; however, the present invention is not restricted by these examples.

(Method for Preparing the Epoxy Resin Composition)

As the epoxy compound (A) jER 604 (made by Japan Epoxy Resins Co., Ltd.), as the epoxy compound (B) jER 630 (made by Japan Epoxy Resins Co., Ltd.), and as the aromatic amine compound (C) MDA-200 (made by Mitsui Chemical Polyurethane, Inc.) were employed. The predetermined amounts of jER 604, jER 630 and MDA-220 were uniformly mixed to obtain the epoxy resin composition.

(Method for Making a Test Specimen)

The thin film formed by casting the epoxy resin composition prepared by the above procedure was cured at 180° C. for 4 hours to make the thin film having thickness of 100 μm consisting of the cured material of the epoxy resin. The thin film was cut into a rectangular form having width of 2 mm and length of 30 mm to give a test specimen.

(Method for Measuring Mechanical Properties)

The measurement of tensile fracture strength, elastic modulus (Young's modulus) and elongation at break of the test specimen was carried out by using a tensile tester with its tension rate of 2 mm/min and the distance of 20 mm between its chucks. The measurement was conducted under a condition with controlled humidity at a temperature of 23° C. and humidity of 50% RH.

(Evaluation of the Resistance to Organic Vapor (Measurement of the Amount of Ethanol-Extraction))

After drying the test specimen in a vacuum at 120° C. for 2 hours, its weight (initial weight) was measured. Subsequently, it was immersed in ethanol at 130° C. for 5 days. The test specimen was taken out from ethanol and dried in a vacuum at 120° C. for 3 days, and subsequently its weight (weight after immersion) was measured. The amount of ethanol-extraction (%) was calculated by the equation below.

Amount of ethanol-extraction(%)=(Initial weight−Weight after immersion)/(Initial weight)×100

The amount of ethanol-extraction is the measurement of the amount that has been eluted by the ethanol immersion, and it is indicative of the resistance to organic vapor. That is to say, the larger value of this amount means the higher susceptibility to the organic vapor when the organic vapor is separated.

(Evaluation of the Moldability of the Tube Sheet)

The fiber bundle formed by bundling 12,000 of the polyimide hollow fiber membranes (length; 100 cm, outside diameter; 500 μm) was placed in a mold having 100 mm-diameter as shown in FIG. 2b. The fiber bundle was allowed to stand substantially perpendicularly in the mold placed downwards. The epoxy resin composition heated at 60° C. which was prepared by the afore-mentioned procedure was gradually injected into the mold that was maintained at 40° C., and then curing of the epoxy resin was carried out by heating at 120° C. to mold a tube sheet. The amount of injected epoxy resin was controlled so that the thickness of the tube sheet was about 90 mm. After curing, the hollow fiber element was taken out from the mold and visually examined and the tube sheet was broken in nearly half to visually examine the condition of its centric part.

The moldability in molding the tube sheet was evaluated as follows. In terms of the filling property in the fiber bundle, it was rated as "good" when the epoxy resin composition was charged throughout all parts of the region to be filled with the epoxy resin composition, and it was rated as "bad" when 50% or more of the space that should be filled was not filled.

In terms of the climbing of liquid, thickness of the thickest part and the mean thickness of the molded tube sheet were compared, and when the difference was 20 mm or larger, it was rated as "bad", and when the difference was less than 20 mm, it was rated as "good".

In terms of molding sink, diameter of the shrinkage around the circumferential part of the molded tube sheet was observed, and when the molding sink occurred in a range equal to or larger than 20 mm diameter, it was rated as "bad", and when the molding sink of 5 mm or larger did not occur, it was rated as "good".

Example 1

In accordance with the afore-mentioned method, the epoxy resin composition was prepared that contains 70 parts by weight of jER 604, 30 parts by weight of jER630 and 44.1 parts by weight of MDA-220. This epoxy resin composition was cured into a test specimen and Table 1 shows the results of the measurements for the mechanical properties and amount of ethanol-extraction. The Young's modulus was 2.9 GPa and the elongation was 6.6%. The amount of ethanol-extraction was a low value, 1.0%. The moldability of the tube sheet using this epoxy resin composition was evaluated, and the results were shown in Table 1.

Tube sheets were formed at both end parts of the hollow fiber bundle to produce a hollow fiber element by a similar method to the method explained for the evaluation of the moldability of the tube sheet. The obtained tube sheet had an excellent form.

Examples 2 and 3

The epoxy resin compositions with the formulation shown in Table 1 were prepared, and were evaluated in a similar manner to the example 1. The results are shown in Table 1. The tube sheets were formed at both end parts of the hollow fiber bundle to produce hollow fiber elements by a similar method to the method explained for the evaluation of the moldability of the tube sheet. The obtained tube sheets had an excellent form.

Comparative Example 1

In accordance with the afore-mentioned, the epoxy resin composition was prepared that contains 100 parts by weight of jER 630 and 50.6 parts by weight of MDA-220, and it was evaluated in a similar manner to the example 1. The results are shown in Table 2.

Comparative Example 2

A similar evaluation to the example 1 was carried out for the epoxy resin composition having a formulation of 50 parts by weight of jER 604, 50 parts by weight of jER 630 and 46.0 parts by weight of MDA-220. The results are shown in Table 2.

The tube sheets were formed at both end parts of the hollow fiber bundle to produce a hollow fiber element by a similar method to the method explained for the evaluation of the moldability of the tube sheet. However, intense elevation of liquid and too large molding sink were observed, and therefore a good tube sheet was not obtained.

Comparative Example 3

In accordance with the afore-mentioned, the epoxy resin composition was prepared that contains 100 parts by weight of jER 604 and 41.3 parts by weight of MDA-220, and it was evaluated in a similar manner to the example 1. The results are shown in Table 2.

The moldability of the tube sheet using this epoxy resin composition was evaluated, and the results were shown in Table 2. The tube sheets were formed at both end parts of the hollow fiber bundle to produce a hollow fiber element by a similar method to the method explained for the evaluation of the moldability of the tube sheet. However, the epoxy resin composition was not sufficiently charged into the mold, and therefore a good tube sheet was not obtained.

TABLE 1

|  | Ex. 1 | Ex. 2 | Ex. 3 |
| --- | --- | --- | --- |
| jER604 | 70 | 80 | 90 |
| jER630 | 30 | 20 | 10 |
| MDA-220 | 44.1 | 43.2 | 42.3 |
| Moldability | | | |
| Filling property in the fiber bundle | good | good | good |
| Climbing of liquid | good | good | good |
| Molding sink of circumferential part | good | good | good |

TABLE 1-continued

|  | Ex. 1 | Ex. 2 | Ex. 3 |
|---|---|---|---|
| Mechanical properties | | | |
| Tensile strength [MPa] | 102.4 | 103.1 | 111.2 |
| Young's modulus [GPa] | 2.90 | 2.88 | 2.91 |
| Elongation [%] | 6.6 | 6.5 | 7.2 |
| Amount of ethanol-extraction (%) | 1.0 | 0.6 | — |

TABLE 2

|  | Comp. Ex. 1 | Comp. Ex. 2 | Comp. Ex. 3 |
|---|---|---|---|
| jER604 | 0 | 50 | 100 |
| jER630 | 100 | 50 | 0 |
| MDA-220 | 50.6 | 46.0 | 41.3 |
| Moldability | | | |
| Filling property in the fiber bundle | good | good | bad |
| Climbing of liquid | bad | bad | unable to make tube sheet |
| Molding sink of circumferential part | bad | bad | — |
| Mechanical properties | | | |
| Tensile strength [MPa] | 103.9 | 107.1 | 100.1 |
| Young's modulus [GPa] | 2.51 | 2.93 | 2.67 |
| Elongation [%] | 8.0 | 7.5 | 7.0 |
| Amount of ethanol-extraction (%) | 0.9 | 0.0 | 3.9 |

Referential Example

Figure 3:
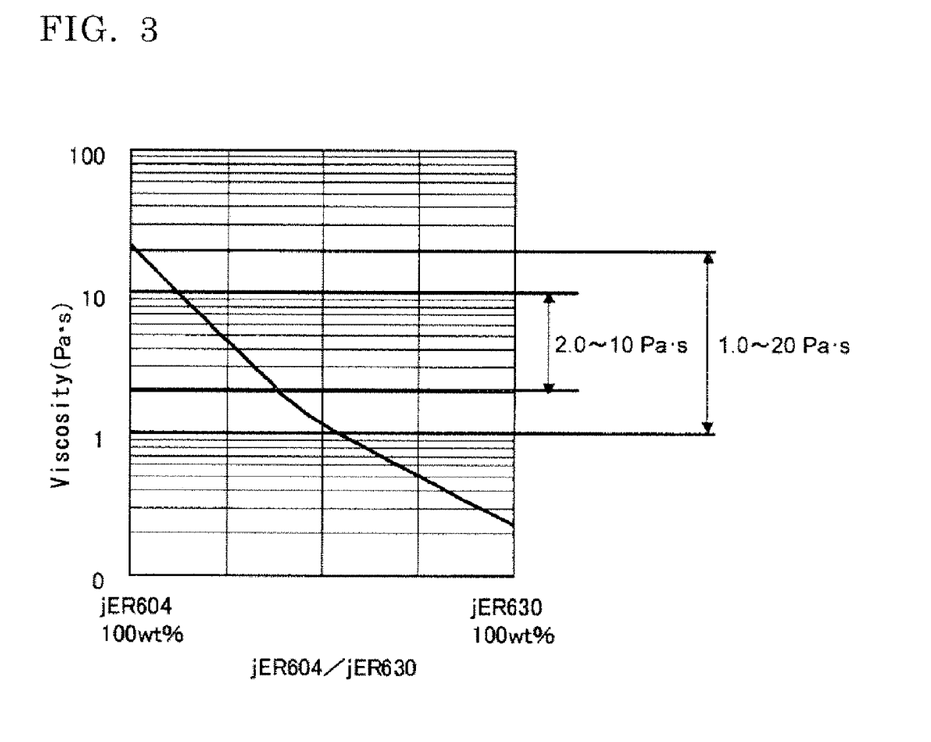
FIG. 3 is a graph showing the viscosity versus the mixing ratio of the mixture with epoxy compound (A) and epoxy compound (B).

The viscosity of the mixture of the epoxy compound (A): jER 604 and the epoxy compound (B): jER 630 was measured by means of a rotational viscometer (shear rate of rotor: 10 sec$^{-1}$) at a temperature of 40° C., and its results are shown in FIG. 3. Since the viscosity varies depending on the mixing ratio of the epoxy compound (A) and epoxy compound (B), the mixture is assumed to have an appropriate viscosity in use at the ratio by weight in a range of 90:10 to 60:40.

From the above results, it turned out that the epoxy resin composition used in according to the present invention is excellent in moldability and enables simplified formation of the tube sheet by static molding. The cured material thereof is also excellent in mechanical properties even under a condition water vapor coexists (condition with controlled humidity), and the amount of ethanol-extraction is little showing high resistance to organic solvent. Thus, it has been demonstrated that the gas separation membrane module for organic vapor separation employing the tube sheet that has been formed by the static molding enables the stable separation of an organic mixture for a prolonged period.

Example 4

At both end parts of the fiber bundle formed by bundling the polyimide hollow fiber membranes (membrane area: 1.9 m$^2$), tube sheets were formed by employing the epoxy resin composition with the composition in the example 1 to produce a hollow fiber element for organic vapor separation. The dehydration of isopropanol was carried out by using the gas separation membrane module for organic vapor separation having the structure of FIG. 1 which housed the hollow fiber element. The solution containing 95.13% by weight of isopropanol and 4.87% by weight of water was heated to produce organic vapor mixture at 120° C., which was supplied to the gas separation membrane module and the dehydration operation was carried out. On the dehydration operation with the separation membrane module, dry nitrogen gas (carrier gas) was heated to 120° C. and circulated to outside of the hollow fiber membrane (the outside part of the hollow fiber, permeate side). At the same time, the permeate side of the hollow fiber membrane was evacuated to 100 mmHg, and the water vapor in the mixed gas was allowed to selectively permeate the membrane for separation. Thus, the dehydration operation of the mixed gas was performed. The permeate vapor and non-permeate vapor from the separation membrane module were cooled down and condensed to give the condensed liquids of the permeate vapor and non-permeate vapor, which were then collected. Table 3 shows the results of the dehydration operation. Although it had continuously been run for one year, no change in its performance was confirmed. In addition, the exteriority of the tube sheet was visually inspected after the running, but no crack nor the like was seen and the exteriority was good.

TABLE 3

| Example 4 | | | | | | | | |
|---|---|---|---|---|---|---|---|---|
| | | | Supplied gas | | Permeate gas | | Non-permeate gas | |
| Flow volume of carrier gas (l/min) | Pressure of supplied gas (kg/cm$^2$G) | Pressure of permeate gas (mmHg) | Flow rate (kg/hr) | Content of H$_2$O (wt %) | Flow rate (kg/hr) | Content of H$_2$O (wt %) | Flow rate (kg/hr) | Content of H$_2$O (wt %) |
| 1.63 | 1.01 | 100 | 1.831 | 4.87 | 0.064 | 95.02 | 1.731 | 0.064 |

INDUSTRIAL APPLICABILITY

The use of the hollow fiber element for organic vapor separation and the gas separation membrane module for organic vapor separation of the present invention enables the effective separation of organic vapor while retaining its gas-tightness even under a condition at an elevated temperature and high pressure and maintaining its performance for the separation in organic vapor separation. In addition, the hollow fiber element of the present invention is easily manufactured by static molding and it is easy to improve productivity.

The invention claimed is:
1. A hollow fiber element comprising:
a separation membrane module for separating an organic vapor, in which at least one end part of a fiber bundle consisting of multiple hollow fiber membranes having a selective permeability is fixed and bound with a tube sheet formed by a cured material of an epoxy resin composition suitable for cast molding by a stationary method, wherein a resin component of the epoxy resin composition consists essentially of:

an epoxy compound (A) represented by the following formula (1):

an epoxy compound (B) represented by the following formula (2):

wherein R denotes an alkyl group having 1 to 3 carbon atoms or a hydrogen atom, and an aromatic amine compound (C) consisting essentially of 4,4'-diaminodiphenylmethane, wherein the epoxy compound (A) and the epoxy compound (B) are blended in a proportion of 90:10 to 60:40 by weight, and wherein the epoxy resin composition retains gas-tightness under organic vapor with an elevated temperature and high pressure.

2. A hollow fiber element for organic vapor separation according to claim 1, wherein the epoxy compound (B) is triglycidyl-4-aminophenol.

3. A hollow fiber element for organic vapor separation according to claim 1, further comprising a core tube which introduces a gas into an approximately center part of the fiber bundle consisting of the multiple hollow fiber membranes.

4. A hollow fiber element for organic vapor separation according to claim 1, further comprising a carrier gas guide film covering a circumferential part of the fiber bundle consisting of the multiple hollow fiber membranes.

5. A method for producing a hollow fiber element for organic vapor separation, comprising:

placing an end part of a fiber bundle consisting of multiple hollow fiber membranes having a selective permeability into a mold suitable for the stationary method;

injecting an epoxy resin composition into the mold; and curing the epoxy resin composition to form a tube sheet at the end part of the fiber bundle, thereby fixing and binding the end part of the hollow fiber membranes, wherein a resin component of the epoxy resin composition consists essentially of:

an epoxy compound (A) represented by formula (1):

an epoxy compound (B) represented by formula (2):

wherein R denotes an alkyl group having 1 to 3 carbon atoms or a hydrogen atom, and an aromatic amine compound (C) consisting essentially of 4,4'-diaminodiphenylmethane, wherein the epoxy compound (A) and the epoxy compound (B) are blended in a proportion of 90:10 to 60:40 by weight, and wherein the epoxy resin composition retains gas-tightness under organic vapor with an elevated temperature and high pressure.

6. A method for producing a hollow fiber element for organic vapor separation according to claim 5, wherein the epoxy resin composition injected into the mold is cured in a stationary state to form the tube sheet.

7. A gas separation membrane module for organic vapor separation, comprising:

a vessel having at least a mixed gas inlet, a permeate gas outlet and a non-permeate gas outlet; and the hollow fiber element for organic vapor separation according to claim 1 housed in the vessel.

8. A gas separation membrane module for organic vapor separation according to claim 7, wherein the vessel further comprises a carrier gas inlet.

9. A gas separation membrane module for organic vapor separation according to claim 7, wherein the mixed gas inlet and the non-permeate gas outlet communicate with an internal space of the hollow fiber membranes, and the carrier gas inlet and the permeate gas outlet communicate with an external space of the hollow fiber membranes.

10. A method for separating organic vapor mixture, which employs the gas separation membrane module for organic vapor separation according to claim 7.

11. A method for separating organic vapor mixture according to claim 10, wherein the organic vapor mixture is introduced from the mixed gas inlet at a temperature not lower than 80° C., wherein a highly-permeable component is allowed to selectively permeate the hollow fiber membranes, thereby producing a highly-purified organic vapor as a permeate vapor or as a non-permeate vapor.

12. A hollow fiber element for organic vapor separation according to claim 1, wherein the elevated temperature is at least 80° C.

13. A hollow fiber element for organic vapor separation according to claim 1, wherein the high pressure is up to 6 atm.

14. A method for producing a hollow fiber element for organic vapor separation according to claim 5, wherein the elevated temperature is at least 80° C.

15. A method for producing a hollow fiber element for organic vapor separation according to claim 5, wherein the high pressure is up to 6 atm.

* * * * *